US005280634A

United States Patent [19]

Aneha

[11] Patent Number: 5,280,634

[45] Date of Patent: Jan. 18, 1994

[54] RADIO CONTROL TRANSMITTER WITH VARIABLE FUNCTION SWITCHES

[75] Inventor: Akira Aneha, Mobara, Japan

[73] Assignee: Futaba Denshi Kogyo Kabushiki Kaisha, Mobara, Japan

[21] Appl. No.: 561,322

[22] Filed: Aug. 1, 1990

[30] Foreign Application Priority Data

Aug. 4, 1989 [JP] Japan ............ 1-091465

[51] Int. Cl.[5] ............ H04B 1/034

[52] U.S. Cl. ............ 455/95; 455/186.1; 340/825.72

[58] Field of Search ............ 455/88, 89, 90, 95, 455/186.1, 186.2; 340/825.19, 825.69, 825.72; 341/23; 446/456; 244/189, 190; 364/709.14

[56] References Cited

U.S. PATENT DOCUMENTS

| | | | |
|---|---|---|---|
| 4,367,559 | 1/1983 | Tults | 455/186.2 |
| 4,823,311 | 4/1989 | Hunter et al. | 341/23 |
| 4,916,446 | 4/1990 | Yamamoto | 340/825.72 |
| 4,954,820 | 9/1990 | Kohno et al. | 240/825.69 |

*Primary Examiner*—Reinhard J. Eisenzopf
*Assistant Examiner*—Edward Urban
*Attorney, Agent, or Firm*—Oblon, Spivak, McClelland, Maier & Neustadt

[57] ABSTRACT

A radio control transmitter capable of permitting the functions of various function switches to be set as desired through only a simple switching operation without requiring replacement of a wiring. Operation switches and operation functions which are desired to be shifted are selected by selecting switches and data on two operation functions are replaced with each other through two data holding registers, resulting in replacing the functions of two function switches with each other.

8 Claims, 3 Drawing Sheets

RADIO CONTROL TRANSMITTER WITH VARIABLE FUNCTION SWITCHES

BACKGROUND OF THE INVENTION

This invention relates to a transmitter for a radio control device, and more particularly to a radio control transmitter suitable for both industrial use and use for a model.

A conventional radio control transmitter generally has various functions for setting a movable range of a stick, a position of the stick and the like. The functions are adapted to be adjusted by operating a switch provided for every function.

Unfortunately, the conventional radio control transmitter has a disadvantage that a user fails to vary the function of each switch as desired, because a relationship between each of the functions and a switch for adjustment is fixedly determined. For example, supposing that the function of each switch is set for the convenience of a right-handed person, when it is desired to replace the functions of right and left switches with each other for the convenience of a left-handed person, it is required to vary a wiring in the radio control device.

SUMMARY OF THE INVENTION

The present invention has been made in view of the foregoing disadvantages of the prior art.

Accordingly, it is an object of the present invention to provide a radio control transmitter which is capable of permitting the function of a function key to be readily set as desired.

In accordance with the present invention, there is provided a radio control transmitter which comprises a plurality of operation means such as switches provided at predetermined positions of the radio control transmitter; a storing means for storing each of data on a plurality of operation functions in correspondence to the operation means, a selecting means for selecting a desired operation means from the operation means and a desired operation function from the operation functions, a first data holding means for holding a data on the operation function selected by the selecting means, a second data holding means for holding a data on another operation function which the operation means selected by the selecting means currently has in the storing means, and a data transfer means for transferring a data held in the first data holding means to the storing means corresponding to the selected operation means and transferring a data held in the second data holding means to the storing means corresponding to another one of the operation means to which a data on the selected operation function has been supplied.

In the radio control transmitter of the present invention constructed as described above, a desired operation function and an operation means in which the operation function is desired to be set are selected through the selecting means. A data on the selected operation function is held in the first data holding means. A data on the operation function which the selected operation means already has had is held in the second data holding means. The data transfer means serves to transfer the data held in the first data holding means to the storing means corresponding to the selected operation means and transfer the data in the second data holding means to the storing means corresponding to another one of the operation means which has had the selected operation function.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENT

Now, a radio control transmitter according to the present invention will be described hereinafter with reference to the accompanying drawings.

Figure 1:
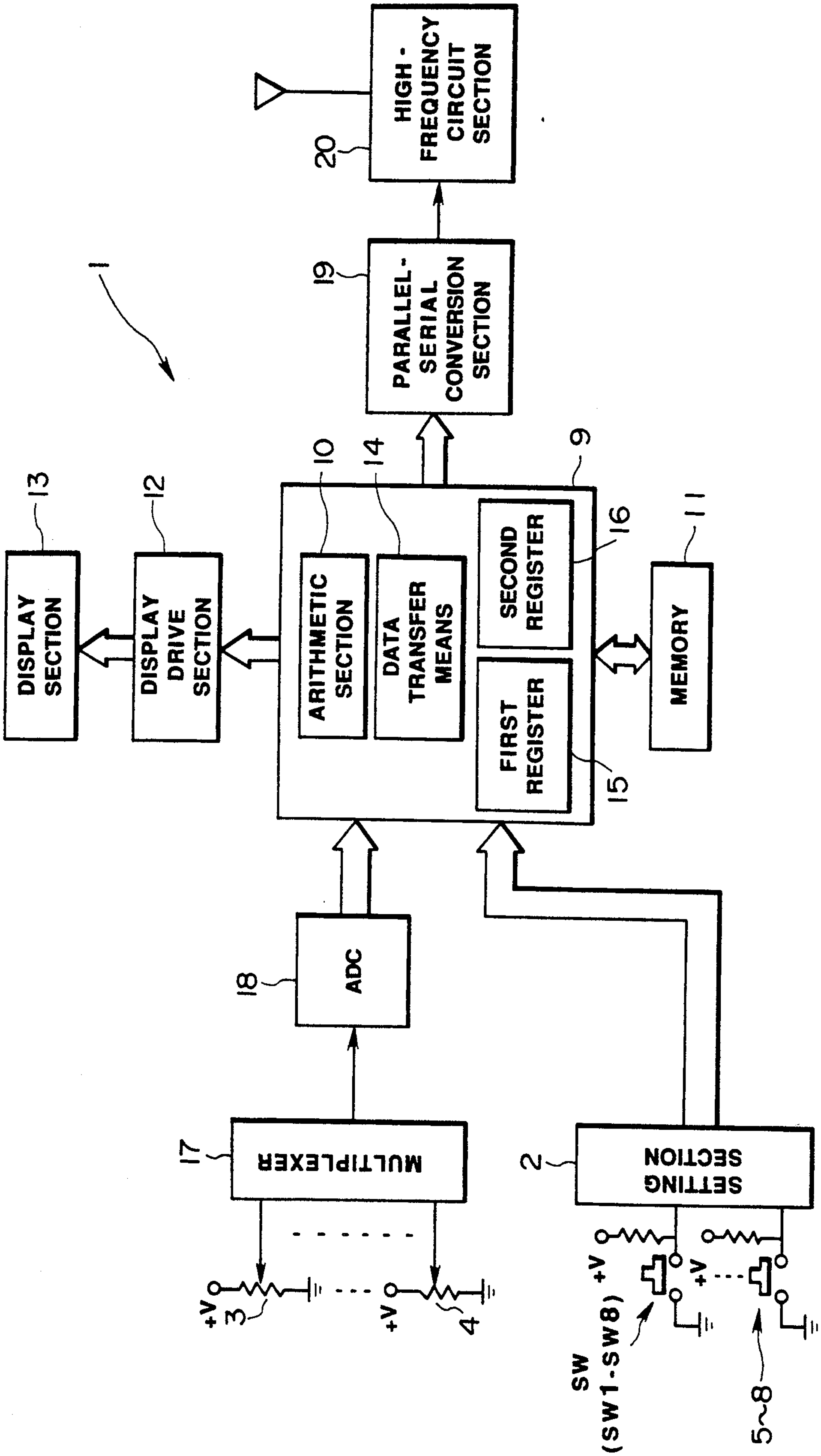
FIG. 1 is a block diagram showing the function of an embodiment of a radio control transmitter according to the present invention.
Figure 2:
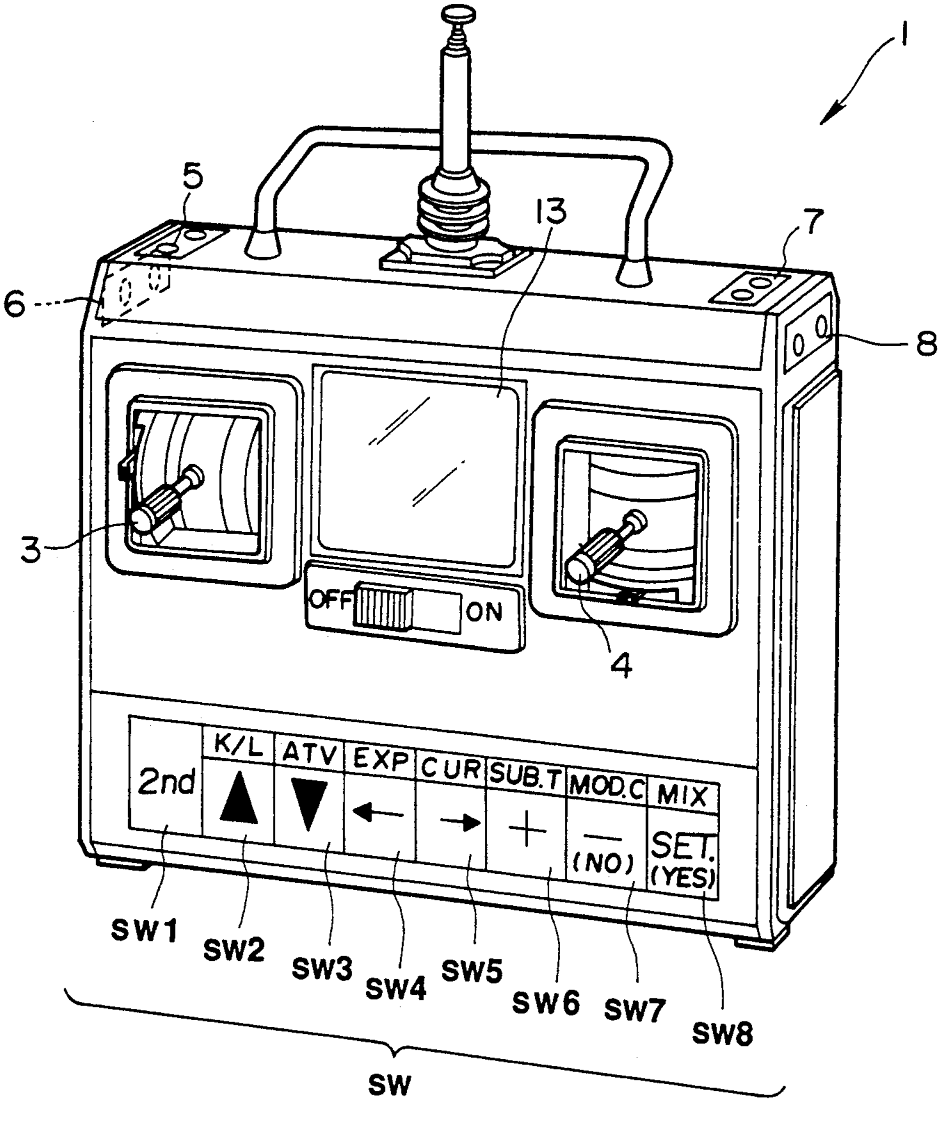
FIG. 2 is a perspective view showing an appearance of the radio control transmitter shown in FIG. 1.
Figure 3:
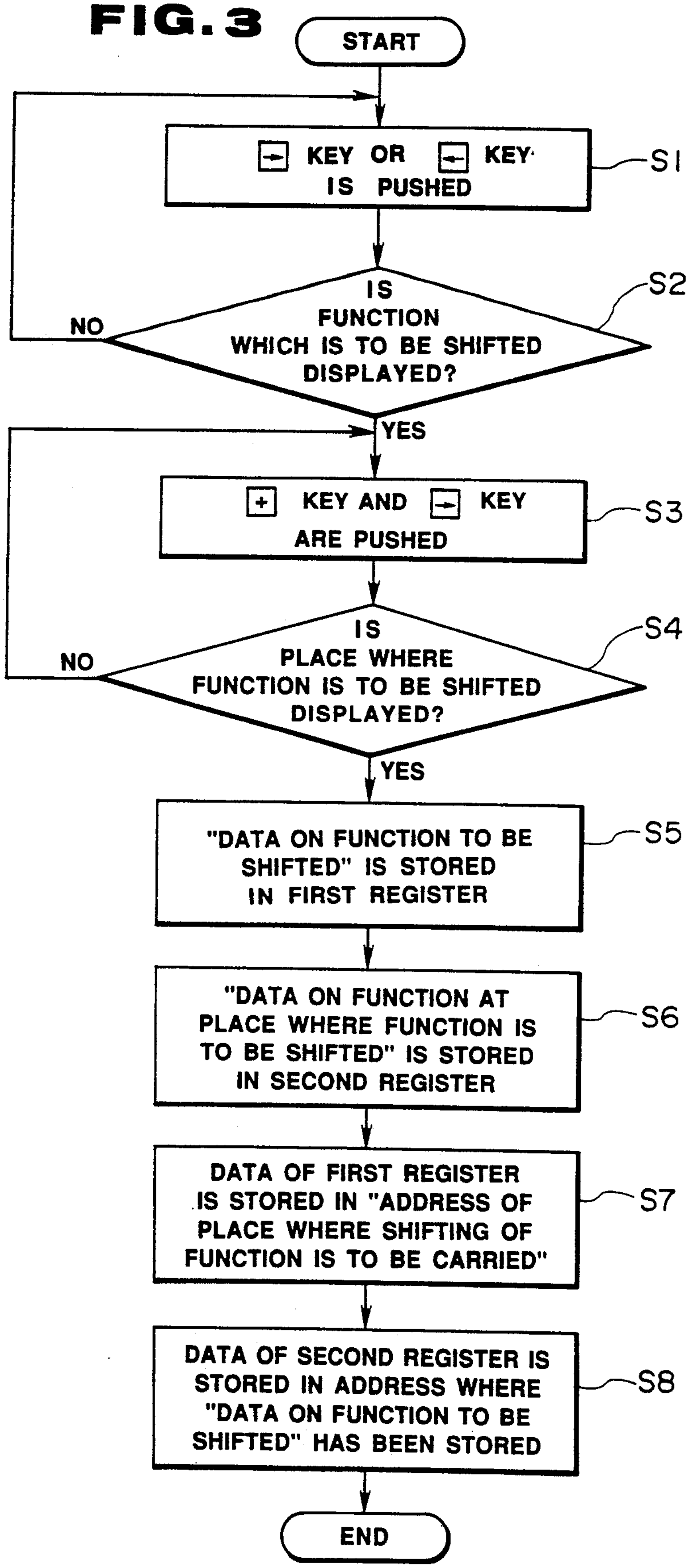
FIG. 3 is a flow chart showing the function of the radio control transmitter shown in FIG. 1.

FIGS. 1 to 3 illustrate an embodiment of a radio control transmitter according to the present invention. A radio control transmitter of the illustrated embodiment generally indicated at reference numeral 1 has a plurality of function modes selectable as desired and is adapted to set, as desired, various data required for control in each of the function modes.

The selection of the function modes and the setting of the various data, as shown in FIG. 1, are carried out by means of setting switches SW provided in a setting section 2. As shown in FIG. 2, the setting switches SW are arranged on the front surface of a body of the transmitter and each are adapted to exhibit two functions. More particularly, a switch SW1 serves as a second switch for changing over the operation mode of each of the setting switches SW and the setting switches SW each exhibit two different functions indicated in both upper and lower columns on the surface thereof in two operation modes or a normal operation mode and a second operation mode which are changed over by the second switch SW1.

In the normal operation mode, the setting switches SW each exhibit the function indicated in the lower column. More particularly, the setting switches SW2 and SW3 each exhibit a vertical scroll function for scrolling various function modes, the setting switches SW4 and SW5 each exhibit a function for selecting a channel in each of the function modes or the like, the setting switches SW6 and SW7 each exhibit a function for varying the amount of setting in each of the function modes, and the setting switch SW8 functions as a set switch.

Also, each of the setting switches SW is adapted to immediately select the function mode specified in the upper column, when it is pushed after the second switch SW1 is pushed to change over the operation mode from the normal operation mode to the second operation mode. Of a number of function modes which the radio control transmitter 1 of the illustrated embodiment has, these specified function modes are used with very high frequency. More particularly, the setting switch SW2 indicates a key lock (K/L) mode and the setting switch SW3 indicates an adjustable travel volume (ATV) mode for setting a maximum operation range of a servo with respect to a maximum movable range of a stick. The setting switch SW4 indicates an exponential (EXP) mode for exponentially setting the operation characteristics of a stick for steering or a rudder and the setting switch SW5 indicates a CUR mode for exponentially setting the operation characteristics of a stick for a throttle. The setting switch SW6 indicates a sub-trim (SUB.T) mode for setting a neutral position of the stick and the setting switch SW7 indicates a model recall (MOD.C) mode for calling information stored in a memory. The setting switch SW8 indicates a mixing (MIX) mode.

The body of the radio control transmitter of the illustrated embodiment also includes function switches 5, 6, 7 and 8 arranged on the left upper surface LU, left side surface LS, right upper surface RU and right side surface RS thereof, respectively. The function switches 5 to 8 each comprise two switches different in polarity and function as an operation means.

The four function switches 5 to 8 each have a steering rate (D/R) function and a trim function for one stick 3 for controlling steering of a controlled unit and an adjustable throttle limiter (ATL) function and a trim function for the other stick 4 for controlling a throttle, and are used for adjusting the position and movable range of each of the sticks 3 and 4 as desired. The illustrated embodiment is so constructed that a combination of the four function switches 5 to 8 with the above-described four functions may be determined as desired by an operator, however, a combination of each of the functions with each of the function switches and an operation for replacing the functions with each other are carried out in a switch position set mode. More particularly, the illustrated embodiment is so constructed that the function mode is scrolled by the setting switches SW2 and SW3 to set the remote control transmitter at the switch position set mode, and then selection of the function switches 5 to 8 and selection of the functions are carried out through the setting switches SW4 to SW6 each serving as a selecting means.

Also, the radio control transmitter 1 of the illustrated embodiment, as shown in FIG. 1, is constructed in such a manner that various data set in the setting section 2 which is provided therein with the setting switches and function switches are supplied through an arithmetic section 10 of a control section 9 to a memory 11 functioning as a storing means and stored therein. The so-stored data are displayed on a display section 13 by means of a display drive section 12 as required.

The memory 11 is adapted to store data on the above-described four operation functions in addresses designated in correspondence to the four function switches 5 to 8, respectively. The data on the operation functions stored in the memory 11 are adapted to be replaced with each other through a data transfer means 14 of the control section 9 and a first resister 15 and a second register 16 respectively serving as a first data holding means and a second data holding means by operating the setting switches SW4 to SW6, as desired.

Then, control signals generated from the sticks functioning as a control means for a controlled unit each are converted into a serial signal at every channel by a multiplexer 17, which is then subject to A/D conversion by an A/D conversion section 18 and then input to the control section 9. The output signal of the A/D conversion section 18 and the above-described data set in the memory 11 are subject to processing in the arithmetic section 10 according to a program stored in the memory 11 and then converted to a serial signal in a parallel-serial conversion section 19, which is then modulated and output through a high-frequency circuit section 20.

Now, the radio control transmitter of the illustrated embodiment described above will be described hereinafter mainly in connection with a procedure of replacing the functions of the function switches 5 to 8 with one another with reference to FIG. 3.

First, the settinģ switches SW2 and SW3 are operated to scroll the function mode, to thereby set the radio control transmitter at the switch position set mode.

Then, as indicated at a step S1, the setting switches SW4 and SW5 are pushed to carry out selection of the operation functions. The operation functions are successively circulatedly displayed on the display section 13 with the operation of the setting switches SW4 and SW5. The operation of the setting switches SW4 and SW5 is stopped at the time when any function which is desired to be shifted is displayed as indicated at a step S2. Then, as indicated at a step S3, the setting switches SW5 and SW6 are pushed to carry out selection of the function switches 5 to 8. This results in the function switches 5 to 8 being successively circulatedly displayed on the display section 13 with the operation of the setting switches SW5 and SW6. The operation of the setting switches SW5 and SW6 is stopped at the time when a destination or place where the shifting of the function is to be carried out (for example, a mark such as LU, LS, RU, RS or the like which indicates each of the positions of the function switches 5 to 8) is displayed on the display section as indicated at a step S4.

Subsequently, as indicated at a step S5, the data on the operation functions selected at the steps S1 and S2 are transferred from the memory 11 to the first register 15 by a data transfer means 14 of the control means 9.

Then, as indicated at a step S6, the data transfer means 14 of the control means 9 transfers, to a second register 16, data on the operation functions which the function switches 5 to 8 selected at the steps S3 and S4 have in predetermined addresses of the memory 11.

Thereafter, as indicated at a step 7, the data transfer means 14 transfers the data of the first register 15 to an address of the memory 11 corresponding to each of the function switches 5 to 8 selected as a place where the shifting of the function is to be carried out.

Then, as indicated at a step S8, the data transfer means 14 transfers the data of the second register 16 to an address of the memory in which a data on each of the selected operation functions is stored.

Thus, the data transfer means 14 including the first and second registers 15 and 16 acts to permit the operation functions of two function switches to be replaced with each other. The transmitter of the illustrated embodiment may be so constructed that the operation of the setting switches SW permits the polarities of the function switches 5 to 8 to be replaced with one another.

The embodiment has been described in connection with an example that a combination of the four operation functions and four function switches is varied, however, the number of functions and switches may be varied as desired.

As can be seen from the foregoing, the radio control transmitter of the present invention is so constructed that the operation means and operation function desired to be shifted are selected by the selecting means and data on the two operation functions are replaced with each other through the two data holding means, resulting in replacing the functions of the two operation means with each other. Such construction of the present invention permits the functions of various function switches to be set as desired through only a simple switching operation without requiring the replacement of a wiring.

While a preferred embodiment of the invention has been described with a certain degree of particularity with reference to the drawings, obvious modifications and variations are possible in the light of the above teachings. It is therefore to be understood that within the scope of the appended claims, the invention may be practiced otherwise than as specifically described.

What is claimed as new and desired to be secured by Letters Patent of the United States is:

1. A radio control transmitter for use with a model toy unit comprising:

a plurality of operation means provided at predetermined positions of the radio control transmitter;

a storing means for storing data on a plurality of operation functions in correspondence to said operation means;

a selecting means for selecting a desired operation means from said plurality of operation means and a desired operation function from said plurality of operation functions;

a first data holding means for holding data, from said storing means, on the operation function selected by said selecting means;

a second data holding means for holding data on another operation function which said operation means selected by said selecting means and currently in said storing means; and a data transfer means for transferring said data held in said first data holding means to said storing means corresponding to said selected operation means and transferring said data held in said second data holding means to said storing means corresponding to another one of said operation means to which said data on said selected operation function has been supplied.

2. A radio control transmitter as defined in claim 1, wherein said plurality of operation means include setting switches arranged on the front surface of a body of said transmitter and each of which are adopted to exhibit two functions.

3. A radio control transmitter as defined in claim 1, wherein said plurality of operation means include four function switches, each of which comprise two switches different in polarity and function.

4. A radio control transmitter as defined in claim 3, wherein each of said four function switches have a steering rate (D/R) function and a trim function for controlling steering of a controlled unit and an adjustable throttle limiter (ATL) function and a trim function for controlling a throttle.

5. A radio control transmitter as defined in claim 1, wherein data is supplied through an arithmetic section of a control section to said storing means.

6. A radio control transmitter as defined in claim 5, wherein data stored in said storing means is displayed on a display section by means of a display drive section.

7. A radio control transmitter as defined in claim 1, wherein control signals generated from said operation means are converted into a serial signal at every channel by a multiplexer, which is then subject to A/D conversion by an A/D conversion section.

8. A radio control transmitter as defined in claim 7, wherein an output signal of said A/D conversion section and said data are subject to processing in said arithmetic section and then converted to a serial signal in a parallel-serial conversion section

* * * * *